United States Patent [19]

Weingärtner et al.

[11] 4,083,911

[45] Apr. 11, 1978

[54] GRANULAR ACTIVE ALUMINA WITH HIGH APPARENT DENSITY AND HIGH MECHANICAL DURABILITY

[75] Inventors: Fritz Weingärtner, Horrem, near Cologne; Josef Liebertz, Quadrath-Ichendorf, near Cologne, both of Germany

[73] Assignee: Swiss Aluminium Ltd., Chippis, Switzerland

[21] Appl. No.: 569,494

[22] Filed: Apr. 18, 1975

[30] Foreign Application Priority Data

Apr. 19, 1974  Switzerland .................... 5420/74

[51] Int. Cl.$^2$ .............................................. B01J 21/02
[52] U.S. Cl. ................................... 264/118; 252/463; 423/628

[58] Field of Search ................. 264/333, 56, 140, 143, 264/144, 118; 106/65, 73.4; 423/628; 252/463

[56] References Cited

U.S. PATENT DOCUMENTS 3,795,724   3/1974   Paul et al. .............................. 264/56

Primary Examiner—Donald J. Arnold
Assistant Examiner—John A. Parrish
Attorney, Agent, or Firm—Ernest F. Marmorek

[57] ABSTRACT

Granular active alumina with high mechanical durability is made by activation of an aluminum hydroxide with an apparent density in the green granular condition of at least 2.20g/cm$^3$. The green aluminum hydroxide is subjected to compacting by dry compression before activation by a usual heat treatment. Compacting is preferably by running between two rollers.

5 Claims, No Drawings

GRANULAR ACTIVE ALUMINA WITH HIGH APPARENT DENSITY AND HIGH MECHANICAL DURABILITY

The present invention relates to a granular active alumina with high apparent density and high mechanical durability, especially as regards resistance to fracture. It also concerns the method of manufacture starting from aluminium hydroxide in powder form.

In the following description, the expression "aluminum hydroxide" means both the chemical product with the formula $Al(OH)_3$, i.e. for example the aluminum trihydroxide which results from the manufacturing process according to Bayer, and also the active aluminum oxidehydroxide which is produced from this by partial dehydration.

Active alumina in its various forms is employed at the present time in numerous of of industrial technology. The principal areas of use are the cleaning and the drying of liquids and gases as well as catalysis (catalyst and catalyst carrier).

Its activity is based primarily on its highly porous structure, which imparts to it a internal surface area. The active aluminas which are used in industry differ from one another considerably according to the purpose of use, as regards their physical properties. These differences in the activity and the structure depend primarily on the conditions under which the active alumina is made.

In the large scale manufacturing process according to Bayer, the aluminum hydroxide is produced in very finely divided granular form, and can be converted directly by a heat treatment into powder-form active alumina. In the overwhelming majority of instances, however, the material is used not in powder form, but as a shaped active alumina. In general, it is formed into spherical and cylindrical granules. However, tablets are also made or, very easily, also a granulate of pieces of differing dimensions.

This shaping is necessary, because the active alumina in most cases is employed in reactors or adsorption towers, where it frequently is subject to considerable mechanical loadings (crushing, abrasion). It is consequently clear, that the industrial value of this alumina depends not only on its activity, but also on its mechanical durability, and that numerous efforts have been undertaken and are still being undertaken in order to improve this durability.

Methods for shaping of aluminum hydroxide have been known for a long time. Thus, for example, one obtains granulates of substantially spherical form in rotating drums or dishes, of cylindrical shape by extrusion, and tablets by compression, "Natural" granulates are also known, which are obtained by milling of encrustations, which form on the walls of containers in the course of the Bayer process. However, these encrustations normally contain, along with aluminum hydroxide, significant, and often undesired, impurities, especially sodium hydroxide and sodium salts.

The shaping of the starting product occurs usually in the damp state with the addition of water and/or suitable binders, as for example mineral acids, aluminum nitrate solution, aluminum stearate etc. Moreover, it has appeared advantageous, in the present state of the art, that one first undertakes an activation of the finely divided starting material (aluminum hydroxide) by heat treatment, and subjects the granulates which are formed by the addition of water to a subsequent "ripening" for several hours. With the last step, aluminum hydroxide is formed, and in this way a bonding or a holding together of the individual grains into a united granulate is achieved by chemical forces.

Thus in most cases, if not in fact in the totality of the known shaping processes, the cohesion is substantially of a chemical nature, and acts upon the surfaces of the granules. Even in the case already mentioned of natural forming (encrustation) the cohesion force is chemical in nature.

The efforts underlying the present invention were undertaken with the objective of improving the breaking strength of the active alumina granulate with simultaneous maintenance of the adsorption properties, and also if possible to simplify the technique of production of these granulates.

These objectives were achieved according to the present invention.

The active aluminum oxide granules must, according to the invention, possess an elevated "apparent density", which is achieved in that the aluminum oxide employed as starting material) ("green" "material" is compacted dry until it attains an apparent density of at least 2.20 g/cm$^3$.)

By "apparent density" one here understand the density of the material with the pore contribution included, this being in contrast to the "true" or physical density.

In the preferred compacting step, the "green" material is pressed together between two cylinders, under elevated pressing force, which usually is expressed in t/cm roller width.

The starting material or "green" material can consist entirely of powder-form aluminum hydroxide, and particularly of the aluminum hydroxide which is obtained in the conventional method (Bayer method). According to the state of drying, this hydrate contains about 34 to 35 percent water of constitution. A particularly well suited starting hydroxide is a "green" material, which contains sodium-containing impurities, expressed in $Na_2O$, up to a proportion of $Na_2O$ to $Al_2O_3$ less than or equal to 0.005.

In the course of the series of experiments undertaken, it has been established that, with a compacting of the granulated "green" material to an "apparent density" of at least 2.20 g/cm$^3$, and the subsequent activation of the material, a granulated active alumina is obtained which has a mechanical durability, and especially a resistance to fracture, which are significantly higher than those of comparable conventional material (compare Table 3.).

It is apparent that the "apparent density" of the granulated active material is lower than that of the "green" starting granulate. This depends inter alia on the degree and the conditions of the activation, especially on the residual water content. It is for this reason somewhat difficult to define the active granulate according to the invention otherwise than as expressed above. The experiments have indicated however, that, with the employment of a "green" starting granulate, a comparable active product is always obtained, which has a variable apparent density to an allowable extent, but always significantly above that of usual commercial granulated active aluminas, which have a comparable residual water content (compare Table 2).

But what appeared particularly surprising, was the fact that this compression, which brought with it an improvement of the mechanical properties of the material compared with the previous usual commercial active alumina, had no negative influences on its adsorption properties, which one would have expected. For the kinetics of any adsorption operation, not only the pores which arise during heat treatment in the primary granules (primary porosity), are significant, but to a similar extent also the size and distribution of the spaces (secondary porosity) between these primary granules which build up the granulate.

The totality of these spaces, which are known as secondary pore structure, serves for the flow of fluid to the areas of adsorption of the activated primary granules and determines the speed of an adsorption process.

In a surprising manner, the higher compression of the material according to the invention leads not to reduction, but to an increase of the speed of adsorption, as was indicated in the example of the decoloring of diesel fuel (see Table 6). It is thus apparent that the granulates with higher apparent density exhibit not only a very notable mechanical durability, but also a secondary pore structure, which is favourable for a rapid distribution of the material to be adsorption.

Experiments on the pore distribution indicate that the secondary pore radii of the green articles according to the invention lie largely in the range from 50 to 75 thousand angstroms-measured with the Model 1500 Carlo Erba porosity meter-however high the pressing force employed may be (see Table 4). In contrast to this, the secondary pores in the green bodies of usual commercial materials are distributed over significantly greater ranges. The narrow secondary pore distribution of the green article is reflected in a thorough freedom from shrinkage cavities of the activated material according to the invention also, which also reveals itself in a high final density.

Conditioned in this way, the material according to the invention opens up new areas of employment for active aluminas as adsorption materials in aqueous solutions. Usual commercial materials in fact possess, by reason of their restricted strength as well as their non-homogeneous distribution of pores, a significantly more restricted wet strength in aqueous systems than that of the material according to the invention; and this is particularly the case for "natural" granulates from encrustations).

The homogeneous pore structure of the material according to the invention leads moreover to a higher ability to withstand temperature change, which enables the material to be conveyed directly to a regeneration oven while still damp, and thus enables one to improve significantly the economy of an adsorption cleaning process with active aluminas.

By variation of the pressing force, the method according to the invention makes possible the desired influencing of the secondary pore volume as well as the secondary pore distribution, and thus the suitability of the material for special cases of use for selective adsorption (see Table 5).

As compared with the conventional methods of manufacture - for example granulation by building up - the method according to the invention also shows the advantage of a significantly better reproducibility of the quality of the material.

The experiments permit one to establish that this granulate with high green density can be obtained in a simple way by dry compression of the aluminum hydroxide, even without addition of a binder, while one allows it to run continuously between two pressure rollers.

By dry compression is to be understood that the material to be compressed (alumina trihydrate in delivered condition or partly dehydrated) is already in the dry condition, and that, at the instant of compression, one adds practically no further water.

It is under these circumstances of considerable surprise that, in order to obtain this granulate with high apparent density, one does find it necessary to have to employ the aid of a binder, as is the case with usual granulating methods for production of shaped active aluminas.

The step of compression according to the invention is, for example, carried out with the help of a roller press of conventional type. The powder-form aluminum hydroxide is preferably compressed to a preliminary extent, before it is compacted. The specific compression force exerted by the rollers is controllable, and can vary between 2.5 and 20 t for each cm of roller width.

The material obtained in this way is an endless strip, which is broken up into pieces of the desired size. This breaking up can take place by known means (spiked rollers, jaw breakers, hammer mills etc).

Finally, the activation of the compacted and granulates "green" material obtained in this way is carried out by a heat treatment in known manner.

Further features and advantages of the invention appear from the description of an example of the method of carrying out the process as well as a series of comparative experiments.

EXAMPLE

Aluminum hydroxide ($Al(OH)_3$), as it was received by precipitation from a sodium-aluminate liquor (normal Bayer process) and then dried, was subjected to the method. Its content of remaining free water (humidity) lay approximately between 0.1 percent and 1.0 percent.

The dry hydrate is first subject to a preliminary compression in a compression screw, and thereafter it goes directly to true compression (compacting), without water or a binder being added. The preliminary compression facilitates the constant and homogeneous loading of the compacting machine.

The compacting device is provided with two press cylinders, the specific compression force of which is adjustable, up to 20 t for each cm of cylinder width.

From this there results a plate or strip of compacted aluminum hydroxide (approximately 1 cm thick), the apparent density of which is a function of the compression force (see Table 1).

The material is thereafter crushed in a hammer mill, and thereby converted into a coarsely granular particulate form, and is then sieved according to particle size. Particles which are too fine are returned to the compacting unit, and particles which are too big to the pulverizing unit. Thereafter it is activated in a rotary oven with indirect heating.

Table 1

Proportion between the specific compacting force, the apparent density in the green condition, and the resistance to fracture in activated condition, of the material obtained from the Example given above.

| Specific compacting force t/cm of roller width | Apparent density in green condition g/cm$^3$ | Resistance to fracture in activated condition (granules of 3mm)kp. |
|---|---|---|
| 1.76 | 2.14 | 1.72 |

-continued

| Specific compacting force t/cm of roller width | Apparent density in green condition g/cm³ | Resistance to fracture in activated condition (granules of 3mm)kp. |
|---|---|---|
| 2.94 | 2.21 | 6.90 |
| 4.40 | 2.29 | 7.20 |
| 5.90 | 2.36 | 10.20 |
| 11.60 | 2.37 | 10.20 |
| 13.30 | 2.39 | 9.60 |
| 15.90 | 2.40 | 9.90 |

The measurement of the apparent density was made with a usual pyknometer, while care was taken previously each granule was coated in a very fine plastic spray impermeable to the liquid of the pyknometer. The weight and volume of this film can be disregarded, for they lie far below 1 percent of the corresponding values for the granule. This apparent density thus includes the primary and secondary porosities. Similar results were also obtained according to a method of determination in which mercury is employed as immersion liquid (L.Sagar, Sprechsall 101 (1968), 1114 to 1120).

The measurement of the resistance to fracture was carried out with the help of an apparatus provided for this purpose which is obtainable on the market (Pellet Fracture Tester type LTC/Chatillon, Kew Gardens, N.Y. 11415).

Range of measurements 0 to 25 kg.
Accuracy ± 0.5 percent
The results correspond to absolute values, and are thus comparable.

The results of Table 1 show that one obtains in practice a nearly maximum apparent density and a maximum resistance to fracture, if one employs a specific pressing force of more than six tons per cm of roller width.

Table 2

Apparent densities and residual water contents of active aluminas of various origin in activated and partly in "green" condition. Comparable values of the compacted active alumina according to the invention.

| Test | Type of Granulate | Apparent density g/cm green | Apparent density g/cm active | % Residual Water |
|---|---|---|---|---|
| A* | "Natural" granulate of alumina encrustation "tel quel" | | 1.75 | 13.5 |
|  | further activated | | 1.60 | 5.1 |
| B | "Artificial" granulate: spherical shape granulate | 1.56 | | 24.4 |
|  |  |  | 1.35 | 3.6 |
| p | Spherical shape granulate tel quel |  | 1.48 | 15.8 |
|  | further activated |  | 1.26 | 3.6 |
| E | Granulate according to the invention | 2.20 |  | 34.6 |
|  |  |  | 1.79 | 14.0 |
|  |  |  | 1.71 | 11.6 |
|  |  |  | 1.70 | 7.6 |
|  |  |  | 1.68 | 7.2 |
|  |  |  | 1.60 | 1.6 |
| E₂ | Granulate according to the invention | 2.28/ 2.29 |  | 34.6 |
|  |  |  | 1.94 | 18.1 |
|  |  |  | 1.78 | 12.3 |
|  |  |  | 1.73 | 7.5 |
|  |  |  | 1.62 | 2.3 |

It can be recognized from the Table that the aluminas which are dry compressed purely mechanically according to the invention, as compared with the usual commercial materials, exhibit a significantly higher apparent density both in the "green" and also in the "activated" condition, with comparable residual water contents.

The graphical representation of the values given in Table 2 ("apparent density" as a function of the water content of the "artificial" granulates) exhibits these findings even more clearly.

Table 3

Resistance to fracture of various granules of usual commercial active aluminas in comparison with the material according to the invention:

| Identification of test piece | Resistance to fracture (kg) | | |
|---|---|---|---|
|  | 1 - 1.5 mm | 3 mm | 5 mm |
| A | 2.5 | 8.5 | 13.5 |
| M | 2.0 | 2.2 | 4.0 |
| P | 2.2 | 4.0 | 13.0 |
| according to invention press force: 10 t/cm | 3.7 | 9.5 | 16.9 |

As can be seen from Table 3, the resistance to fracture of the material according to the invention at all ranges of granule size is higher than the resistance to fracture of usual commercial materials.

Table 4

The results of Tables 4 and 5 relate to test pieces which were pressed in a die with help of a plunger. Comparison of the pore distributions and green densities of various materials produced according to the invention against a usual commercial product.

| Test pieces | Pressing force | Measured pore volume in the range 50 to 75,000 angstroms pore radius | Measured density | Theoretical density having regard to the pore volume |
|---|---|---|---|---|
| Granulate according to the invention | 3.2t/cm² | 0.102cm³/g | 2.18g/cm³ | 2.18g/cm³ |
|  | 6.45t/cm² | 0.042cm³/g | 2.32g/cm³ | 2.32 g/cm³ |
| P | — | 0.046cm³/g | 1.80g/cm³ | 2.31g/cm³ |

The agreement of the theoretical with the measured density points to the fact that, in material according to the invention, practically no secondary pores lie outside the pore radius range 50 to 75,000 angstroms. In contrast, the significant difference between theoretical and experimental density with the usual commercial material P indicates a significantly more broadly distributed secondary pore spectrum.

Table 5

Pore volume and pore distribution of the activated material prepared by the method according to the invention, as a function of pressing force.

| Pressing force | Pore volume in the range of pore radii 50 to 75,000 angst. | Percentage pore distribution in the range 50 to 75,000 angstroms pore radius | | | |
|---|---|---|---|---|---|
|  |  | <100A | <500A | <1000A | <5000A |
| 3.20t/cm² | 0.193cm³/g | 5% | 13% | 18% | 52% |
| 6.40t/cm² | 0.091cm³/g | 10% | 30% | 45% | 77% |
| 9.60t/cm² | 0.075cm³/g | 17% | 62% | 73% | 90% |

It can clearly be recognized from Table that the secondary porosity of the material according to the invention can be controlled by the pressing force.

Table 6

Comparative measurements of the speed of adsorption of a usual commercial granular activated alumina, and an activated alumina, which has been made according to the invention (specific press force; 10 t per cm cylinder width). What was tested was the speed of decoloration of diesel fuel, in conjunction with the measurement of light absorption values in the course of the decoloration process.

20 ml diesel fuel and 5 g active alumina to be tested were charged into a 150 ml separating funnel. The whole thing was put into a shaking machine, which enabled good contact of the two phases, with uniform conditions for all examples. After a predetermined period of contact, the shaking was stopped. The suspension was poured out, and 1 ml diesel fuel was removed for the analysis. The optical density was measured according to conventional technique, with the help of an electric light colorimeter, type Lumetron 402 E with employment of a 1 cm vessel and color filter 420.

The results are expressed in the Table as light absorption percent compared with water corresponding to 0 percent.

| Contact period | Type of active alumina ||
|---|---|---|
| | P* | According to invention |
| 0 | 63.4 | 63.4 |
| 2 | 55.9 | 47.5 |
| 4 | 55.3 | 45.0 |
| 6 | 55.0 | 41.7 |
| 8 | 52.8 | 39.0 |
| 10 | 50.6 | 38.0 |
| 12 | 48.4 | 36.4 |

*see Table 2

The results show that the adsorption capability of the alumina with high apparent density is not diminished by the compression; on the contrary, the adsoprtion speed is higher than that of usual commercial alumina.

The material according to the invention shows surprisingly good properties not only in the adsorption of coloring matters from organic solvents, it can also be successfully employed for the adsorption removal of organic impurities from aqueous solution e.g. waste waters.

In summary it can be said that the advantages of this new kind of active alumina with high apparent density are based on the one hand on the great resistance to fracture, extended life of production cycles, raising of loading etc., and on the other hand on an improvement of certain characteristics of its activity (e.g. adsorption speed).

The method of manufacture is on the other hand notably simplified, compared with usual methods, and exhibits a series of advantages, among which the following can be mentioned:

absence of any special treatment (partial activation, ripening)
absence of additional materials (water, binder)
good reproduceability of material quality
fully automatic conduct of the manufacturing process
absence of grinding of the starting material.

We claim:

1. In a process for the manufacture of granular activated alumina suitable for use as an adsorbent and having high mechanical durability, the steps comprising:
    compressing green aluminum hydroxide having less than about 1% free water content by dry compression to form a compact body having an apparent density of at least about 2.2 g./cm.$^3$,
    comminuting said compact body into granular particles and
    thereafter heating the resultant granular particles to a temperature sufficient to activate said particles for use as an adsorbent.

2. A method according to claim 1, wherein the compacting step takes place continuously and comprises mounting said aluminum hydroxide between two rollers under a specific pressing force of at least 2.5 t per cm. roller width.

3. A process, as claimed in claim 1, wherein the aluminium hydroxide has a sodium content, expressed in weight ratio $Na_2O/Al_2O_3$, of 0.005 maximum.

4. In a method, as claimed in claim 1, wherein said aluminum hydroxide is of the type prepared by the Bayer Process.

5. A process according to claim 2, wherein the specific pressing force amounts to between 6 to 10 t per cm roller width.

* * * * *